US009058811B2

(12) United States Patent

Wang et al.

(10) Patent No.: US 9,058,811 B2

(45) Date of Patent: Jun. 16, 2015

(54) SPEECH SYNTHESIS WITH FUZZY HETERONYM PREDICTION USING DECISION TREES

(75) Inventors: Xi Wang, Beijing (CN); Xiaoyan Lou, Beijing (CN); Jian Li, Beijing (CN)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 495 days.

(21) Appl. No.: 13/402,602

(22) Filed: Feb. 22, 2012

(65) Prior Publication Data

US 2012/0221339 A1 Aug. 30, 2012

(30) Foreign Application Priority Data

Feb. 25, 2011 (CN) .......................... 2011 1 0046580

(51) Int. Cl.

*G10L 13/02* (2013.01)
*G10L 13/08* (2013.01)
*G06N 7/02* (2006.01)

(52) U.S. Cl.

CPC ...................................... *G10L 13/08* (2013.01)

(58) Field of Classification Search

CPC ......... G10L 13/08; G10L 13/10; G10L 13/02; G06N 7/02

USPC ................... 704/258, 259, 260, 266; 706/1, 8

See application file for complete search history.

(56) References Cited

U.S. PATENT DOCUMENTS 6,081,781 A * 6/2000 Tanaka et al. ................. 704/268
6,098,042 A 8/2000 Huynh
6,366,883 B1 * 4/2002 Campbell et al. ............. 704/260
6,430,532 B2 * 8/2002 Holzapfel ..................... 704/258
6,477,495 B1 * 11/2002 Nukaga et al. ................ 704/268
6,665,641 B1 * 12/2003 Coorman et al. ............. 704/260
7,219,060 B2 * 5/2007 Coorman et al. ............. 704/258
7,657,102 B2 * 2/2010 Jojic et al. ..................... 704/245
7,881,934 B2 * 2/2011 Endo et al. .................... 704/251
8,321,222 B2 * 11/2012 Pollet et al. ................... 704/260
8,346,548 B2 * 1/2013 Owen ........................... 704/231
8,706,472 B2 * 4/2014 Ramerth et al. .................. 704/2

(Continued)

FOREIGN PATENT DOCUMENTS

CN 1836226 A 9/2006
WO 2005020090 A1 3/2005

OTHER PUBLICATIONS

Lu et al., "Heteronym Verification for Mandarin Speech Synthesis", 6th International Symposium on Chinese Spoken Language Processing 2008, ISCSLP '08, 2008, pp. 1 to 4.*

(Continued)

*Primary Examiner* — Martin Lerner

(74) *Attorney, Agent, or Firm* — Ohlandt, Greeley, Ruggiero & Perle, L.L.P.

(57) ABSTRACT

According to one embodiment, a method, apparatus for synthesizing speech, and a method for training acoustic model used in speech synthesis is provided. The method for synthesizing speech may include determining data generated by text analysis as fuzzy heteronym data, performing fuzzy heteronym prediction on the fuzzy heteronym data to output a plurality of candidate pronunciations of the fuzzy heteronym data and probabilities thereof, generating fuzzy context feature labels based on the plurality of candidate pronunciations and probabilities thereof, determining model parameters for the fuzzy context feature labels based on acoustic model with fuzzy decision tree, generating speech parameters from the model parameters, and synthesizing the speech parameters via synthesizer as speech.

10 Claims, 6 Drawing Sheets

(56) References Cited

U.S. PATENT DOCUMENTS

| | | | | |
|---|---|---|---|---|
| 2004/0111266 | A1* | 6/2004 | Coorman et al. | 704/260 |
| 2005/0137871 | A1* | 6/2005 | Capman et al. | 704/268 |
| 2006/0277045 | A1 | 12/2006 | Cleason | |
| 2007/0208569 | A1* | 9/2007 | Subramanian et al. | 704/270 |
| 2008/0120093 | A1* | 5/2008 | Izumida et al. | 704/10 |
| 2009/0048841 | A1* | 2/2009 | Pollet et al. | 704/260 |
| 2009/0063154 | A1* | 3/2009 | Gusikhin et al. | 704/260 |
| 2009/0157409 | A1* | 6/2009 | Lifu et al. | 704/260 |
| 2009/0299731 | A1* | 12/2009 | Owen | 704/9 |
| 2011/0166861 | A1* | 7/2011 | Wang et al. | 704/260 |
| 2011/0320199 | A1* | 12/2011 | Luan et al. | 704/235 |
| 2012/0136664 | A1* | 5/2012 | Beutnagel et al. | 704/260 |

OTHER PUBLICATIONS

Mumolo et al., "A Fuzzy Phonetic Module for Speech Synthesis from Text", The 1998 IEEE International Conference on Fuzzy Systems Proceedings. May 4-9, 1998, vol. 2, pp. 1506 to 1517.*

Lin et al., "A Novel Prosodic-Information Synthesizer Based on Recurrent Fuzzy Neural Network for the Chinese TTS System", IEEE Transactions on Systems, Man, and Cybernetics, Part B: Cybernetics, vol. 34, Issue 1, Feb. 2004, pp. 309 to 324.*

Tao et al., "An Optimized Neural Network Based Prosody Model of Chinese Speech Synthesis System", 2002 IEEE Region 10 Conference on Computers, Communications, Control and Power Engineering, TENCON '02. Proceedings. Oct. 28-31, 2002. vol. 1, pp. 477 to 480.*

Dong et al., "Chinese Prosodic Word Prediction Using the Conditional Random Fields", Sixth International Conference on Fuzzy Systems and Knowledge Discovery, 2009. FSKD '09. Aug. 14-19, 2009, vol. 1, pp. 137 to 139.*

Chinese First Office Action dated Mar. 3, 2015 from corresponding Chinese Application No. 201110046580.4, 8 pages.

* cited by examiner

SPEECH SYNTHESIS WITH FUZZY HETERONYM PREDICTION USING DECISION TREES

CROSS-REFERENCE TO RELATED APPLICATIONS

This application is based upon and claims the benefit of priority from prior Chinese Patent Application No. 201110046580.4, filed Feb. 25, 2011, the entire contents of which are incorporated herein by reference.

FIELD

Embodiments described herein relate generally to speech synthesis.

BACKGROUND

The generation of speech artificially by some machines is called speech synthesis. Speech synthesis is an important component part for human-machine speech communication. Usage of speech synthesis technology may allow the machine to speak like people, and may transform some information represented or stored in other forms to speech, such that people can easily obtain such information by auditory sense.

Currently, a great deal of research is being applied to text to speech (US) systems, in which text to be synthesized is generally input, it is processed by a text analyzer contained in the system, and pronunciation describing characters are output which include phonetic notation in segment level and rhythm notation in super-segment level. The text analyzer first divides text to be synthesized into words with attribute labels and its pronunciation based on pronunciation dictionary, and then determines linguistic and rhythm attributes of object speech such as sentence structure and tone as well as pause word distance and so on for each word, each syllable according to semantic rule and phonetic rule. Thereafter, the pronunciation describing character is input to a synthesizer contained in the system and, through speech synthesis, the synthesized speech is output.

In the art, acoustic models based on the Hidden Markov Model (HMM) have been widely used in speech synthesis technology, and it can easily modify and transform the synthesized speech. Speech synthesis is generally grouped into model training and synthesizing parts. In the model training stage, the training of a statistic model is performed for acoustic parameters contained in respective speech unit in speech database and label attributes such as corresponding segment, rhythm and the like. These labels originate from language and acoustic knowledge, and context features composed of them describe corresponding speech attributes (such as tone, part of speech and the like). In the training stage of the HMM acoustic model, estimation of model parameters originates from statistic computation for these speech unit parameters.

In the art, in view of so much more context combinations with many changes, a tree clustering method using decision trees is generally used to process the changes. Decision trees may cluster candidate primitives having context features similar to that of acoustic features into one category, thereby avoiding data sparsity efficiently and efficiently reducing the number of models. A question set is a set of questions for the construction of the decision tree, and the question selected while node is split is bound to this node, so as to decide which primitives come into the same leaf node. Clustering procedure refers to predefined question set, each node of the decision tree is bound with a "Yes/No" question, all of candidate primitives allowable to come into root node need to answer the question bound on node, and it proceeds into left or right branch depending upon answering result. Thus, each syllable or phoneme having same or similar context feature locates the same leaf node of decision tree, and the model corresponding to the node may be HMM or its state which is described by model parameter. Meanwhile, clustering is also a procedure of learning to process new cases encountered in synthesis, thereby achieving optimum matching. The HMM model and decision tree can be obtained by training and clustering the training data.

In the synthesizing stage, the context feature labels of heteronym are obtained by a text analyzer and a context label generator. For the context feature label, corresponding acoustic parameter (such as the state sequence of the HMM acoustic model) are found in the trained decision tree. Then, a corresponding speech parameter is obtained by performing the parameter generating algorithm on the model parameter, such that speech is synthesized by synthesizer.

The target of the speech synthesis system is to synthesize intelligent and natural voices. However, it is difficult to guarantee precision of pronunciation for Chinese speech synthesis systems, because pronunciation of the heteronym is often determined according to semantic and comprehension of semantic is a challenge task. Such dependency results in lower than satisfactory precision for prediction of heteronym. In the art, even if the prediction of a pronunciation isn't affirmative, speech synthesis system can generally provide an affirmative pronunciation for the heteronym.

In Chinese, different pronunciations represent different meanings. If the speech synthesis system provides the wrong pronunciation, the listener may get an ambiguous meaning and it is undesirable. Thus, with respect to the speech synthesis system applied into living, working and science research (such as car navigation, automatic voice service, broadcasting, human robot animation, and etc), unsatisfactory user experience will be caused due to obvious erroneous heteronym pronunciation. Thus, in the field of speech synthesis, there is a need of improved methods and systems for heteronym speech synthesis.

DETAILED DESCRIPTION

Figure 1:
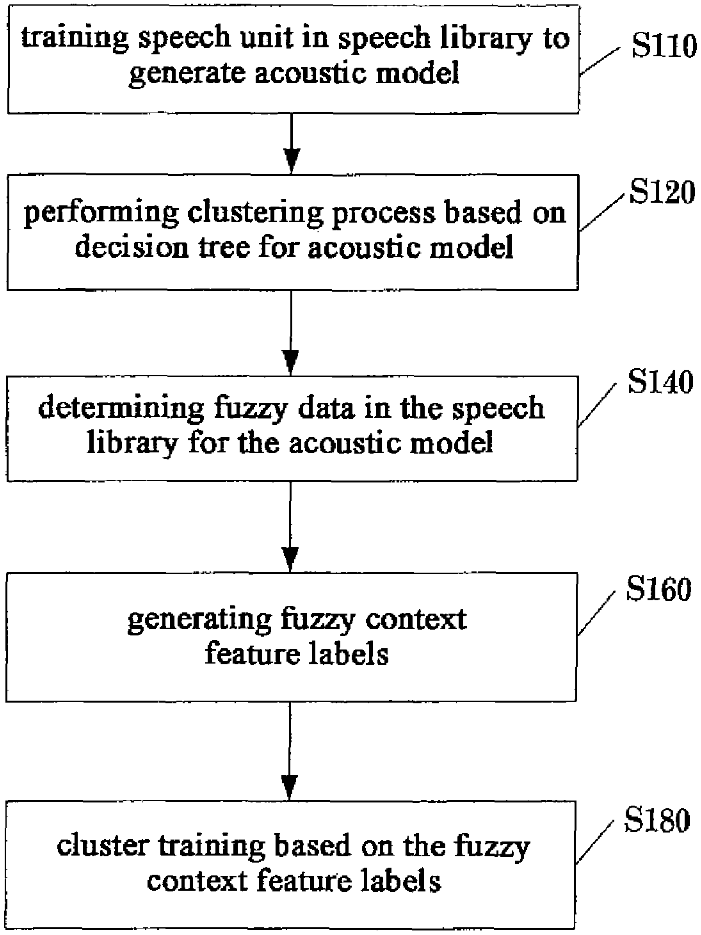
FIG. 1 illustrates a flow chart of a method for training an acoustic model with a fuzzy decision tree according to one embodiment of the invention.

In general, according to one embodiment, a method for speech synthesis is provided, which may comprise: determining data generated by text analysis as fuzzy heteronym data;

performing fuzzy heteronym prediction on the fuzzy heteronym data to output a plurality of candidate pronunciations of the fuzzy heteronym data and probabilities thereof; generating fuzzy context feature labels based on the plurality of candidate pronunciations and probabilities thereof; determining model parameters for the fuzzy context feature labels based on acoustic model with fuzzy decision tree; generating speech parameters for the model parameters; and synthesizing the speech parameters as speech.

Below, the embodiments of the invention will be described in detail with reference to drawings.

Generally, the embodiments of the invention relate to methods and systems for synthesizing speech in electronic devices (such as telephone system, mobile terminal, on-board vehicle tool, automatic voice service system, broadcasting system, human robot, etc and/or the like) and methods for training acoustic models.

Generally speaking, the invention is that, for Chinese heteronym synthesis, unique candidate pronunciation isn't selected, rather pronunciation of fuzzy heteronym is blurred, thereby avoiding arbitrary even erroneous selection beforehand.

In an embodiment of the invention, fuzzy heteronym refers to a heteronym that is difficult to predict by heteronym prediction units in the art; while fuzzy data refers to speech data generated due to the influence of successive speech co-articulation and accidental pronunciation fault of speaker, which satisfies the fuzzy condition (generally, fuzzy threshold can be defined according to member function) and is used for model training. The fuzzy decision tree may be introduced in a training and synthesizing stage to achieve this procedure preferably, and a fuzzy decision is generally used for processing uncertainty, is able to deduce more intelligent decision helpfully in boundary of complexity and blurring, so as to make the optimum selection under blurring. The blurring pronunciation is intended to include features of each candidate pronunciation, especially, that with a larger probability, which can avoid generating erroneous judgments of candidate pronunciation such that the probability of synthesizing harsh or erroneous speech is reduced.

In an embodiment of the invention, in the model training stage, the fuzzy decision tree may be introduced, the speech database including the fuzzy data is further trained, and an acoustic model (such as an HMM acoustic model) and the fuzzy decision tree corresponding to the model are obtained; in the synthesizing stage, when the heteronym prediction unit cannot provide suitable selection, the pronunciation of this word is blurred to synthesize corresponding pronunciation in the synthesizer, so as to make the synthesized voice closer to the candidate with a large predication likelihood. The process in the synthesizing stage may be operated by: obtaining probabilities of a plurality of candidate pronunciations by heteronym predication unit, performing fuzzy context feature process to obtain fuzzy context labels with a plurality of candidate fuzzy features, obtaining corresponding Model parameters from the fuzzy context labels based on the generated acoustic model with fuzzy decision tree by training, obtaining corresponding speech parameters by performing parameter generating algorithm on the model parameter, such that speech is synthesized by synthesizer.

As shown in FIG. 1, in step S110, the respective speech unit in the speech database is trained to generate an acoustic model. In one embodiment of the invention, the speech database is generally reference speech that is recorded beforehand, inputted by a speech input port. The speech unit includes an acoustic parameter and a context label describing corresponding to the segment, syllable attribute.

Taking the HMM acoustic model as an example, in a training stage of the model, the estimation of model parameters originates from a statistic computation for these speech unit parameters, which is known technology widely used in the field and will be omitted for brevity.

In step S120, as to more context combinations with many changes, a tree clustering method of a decision tree is generally used to generate the acoustic model, such as CART (Classification and Regression Tree). Usage of a clustering method may efficiently avoid data sparsity and reduce a number of models. Meanwhile, clustering is also a procedure of learning to process new cases encountered in synthesis, and may achieve optimum matching. Clustering procedure refers to predefined question set. Question set is a set of questions for decision tree construction, and question selected while node is split is bound to this node, so as to decide which primitives come into the same leaf node. Question set may be different depending on specific application environment. For example, in Chinese, there are 5 classes of tones {1, 2, 3, 4, 5}, each of which may be used as a question of decision tree. In a case that tone is determined for heteronym, question set may be set as shown in Table 1:

TABLE 1

| feature | meaning | value |
|---|---|---|
| tone | Tone is 1, 2, 3, 4, 5? | Tone = 1, 2 , 3 , 4 , 5 |

Question and Value used in question set
Its codes may be as follows:

| | | |
|---|---|---|
| QS "phntone == 1" | {"*\|phntone = 1\|*"} | Is tone is 1st class? |
| QS "phntone == 2" | {"*\|phntone = 2\|*"} | Is tone is 2nd class? |
| QS "phntone == 3" | {"*\|phntone = 3\|*"} | Is tone is 3rd class? |
| QS "phntone == 4" | {"*\|phntone = 4\|*"} | Is tone is 4th class? |
| QS "phntone == 5" | {"*\|phntone = 5\|*"} | Is tone is 5th class? |

For those skilled in the art, the usage of a decision tree is common technology in the art, and various decision trees may be used, various question sets may be set, and decision trees are constructed based on the question splitting depending upon various application environments, which will be omitted for brevity.

In an embodiment of the invention, the Hidden Markov HMM model and the decision tree of a corresponding model may be obtained by training and clustering train data. However, those skilled in the art can understand that, other type of acoustic model may also be used in blurring process of the embodiment of the invention.

In an embodiment of the invention, the speech unit may be a phoneme, a syllable or a consonant or a vowel and another unit, only the consonant and vowel are illustrated as the speech unit for simplicity. However, those skilled in the art can understand that the invention should not be limited thereto.

In an embodiment of the invention, the acoustic model is re-trained based on the fuzzy data. For example, in step S140, the fuzzy data in the speech database is determined for the acoustic model with a decision tree (for example, Hidden Markov HMM model). In an embodiment of the invention, the capability of characterizing the real data by the label is estimated by using all possible labels of heteronym and depending on the real data, and then it is determined whether the speech data belongs to the fuzzy data according to the estimation result. Thereafter, in step S160, for the fuzzy data that satisfies the condition, the fuzzy context feature label is generated. Then, in step S180, for the speech database including the fuzzy data, the fuzzy decision tree is trained based on the fuzzy context feature label to generate acoustic model with fuzzy decision tree.

Figure 2:
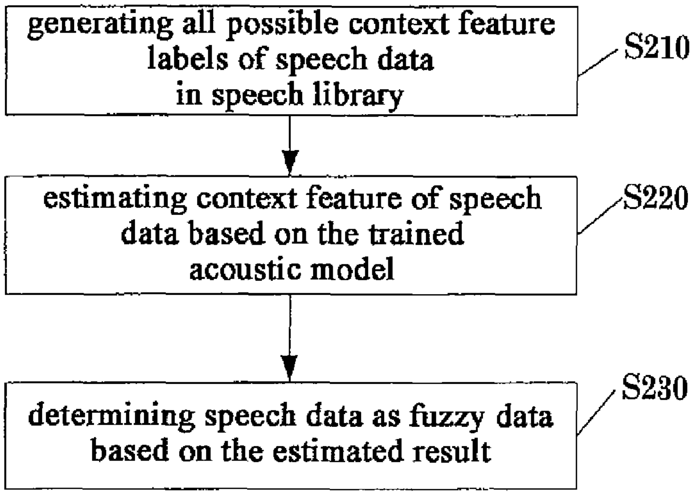
FIG. 2 illustrates a flow chart of a method for determining the fuzzy data according to an embodiment of the invention.

As shown in FIG. 2, in step S210, all possible context feature labels of the speech data in the speech database are generated. All possible context feature labels refer to all possibilities generated as some attributes of heteronym blurring process, such as, tone. In the embodiment of the invention, all possibilities are generated regardless of whether it satisfies language specification. For example, for heteronym "为", theoretically, the pronunciation of this heteronym is wei4 and wei2. Generation of possible labels for all tones refers to the generation of wei1 wei2, wei3, wei4, wei5. The context feature label characterizes attribute of language and tone of segment, such as, real vowel, tone, syllable of speech primitive, its location in syllable, word, phrase and sentence, associated information of relevant unit before and after, and sentence type and so on. Tone is an important feature of heteronym, taking tone as an example, there may be 5 tones in mandarin, then there may be 5 parallel context feature labels for the train data. Those skilled in the art should understand that, for different pronunciations of polyphone, possible context feature labels may also be generated, the process of which is similar with that of tone.

In step S220, the speech data is estimated based on the acoustic model trained in step S120 (such as the HMM model with the decision tree). For example, for a certain speech unit under N parallel context feature labels, N scores corresponding to it may be computed as s[l] . . . s[k] . . . s[N], which reflects capability of characterizing real parameters by the label. In the embodiment of the invention, any method that may scale for estimation may be used, such as, posterior probability under the condition of computation model or distance between model generation parameter and real parameter, which will be described in detail.

In step S230, it is judged whether the speech unit is fuzzy data based on the estimated result, such as, the computed score reflecting characterization. In an embodiment of the invention, the data, of which the estimated score is low, may be determined as fuzzy data for further training. At this point, the meaning that the estimated score is low is that, in parallel the context feature label, all scores don't have sufficient advantage to prove that it is real optimum label of the unit.

In an embodiment of the invention, the degree to which the score corresponding to the context feature labels of the speech unit fall into the category may be computed is based on the membership function. The membership function $m_k$ may be expressed for these parallel scores as follows $$m_k = \frac{s[k]}{\sum_{K=1}^{N} s[k]} \tag{1}$$

Wherein, s[k] is score corresponding to context feature labels, N is number of context feature labels.

In an embodiment of the invention, data that satisfies the fuzzy condition (generally, fuzzy threshold is defined according to the membership function) is fuzzy data. The definition of the fuzzy threshold may be fixed, such as, a candidate of which the score doesn't exceed 50% in all candidates, then this data may be used as the fuzzy data. Alternatively, the fuzzy threshold may also be dynamic, such as, it is possible to select a certain part ranking back (10%) according to score ordering of total number of definition category of current unit in current database.

In an embodiment of the invention, the selection and transformation of the fuzzy data for the training database are advantageous for the whole training, which generates not only data for the fuzzy decision tree training, but contributes to improvement of the training precision of the normal data without greatly increasing computation and complexity.

Figure 3:
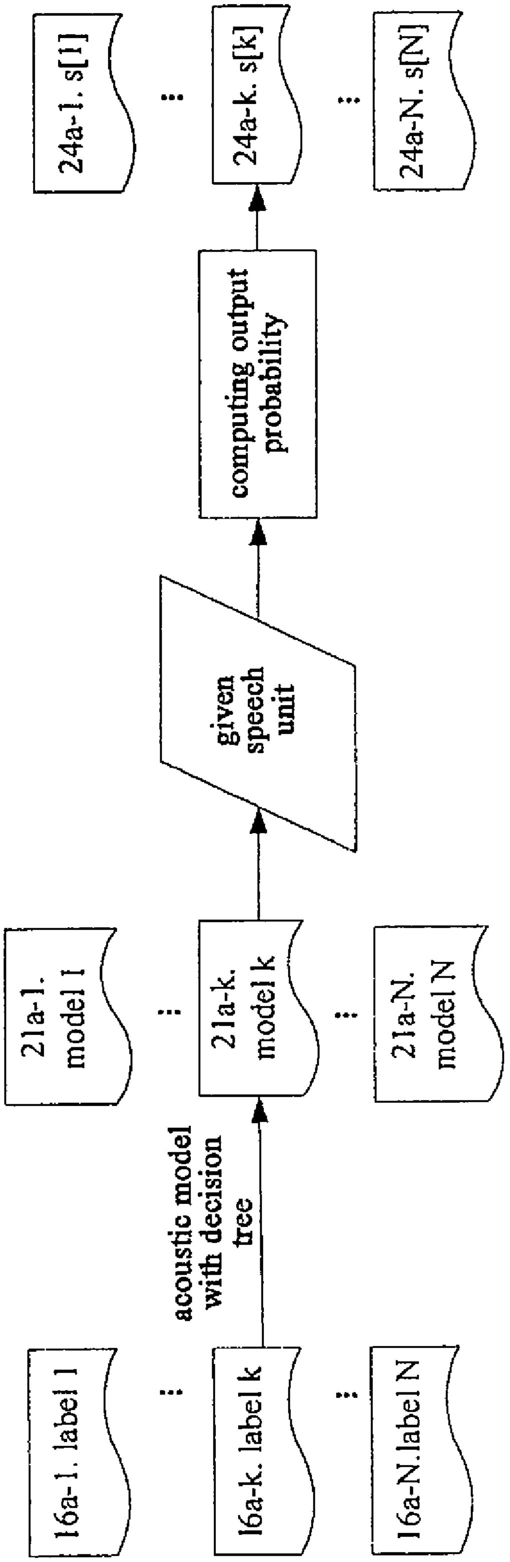
FIG. 3 illustrates a method for estimating training data by a posterior probability model according to an embodiment of the invention.

In an embodiment of the invention, for conciseness, a certain speech unit is taken as an example of the training data. As shown in FIG. 3, for N possible context feature labels 16*a-l* label l . . . 16*a-k* label k . . . 16*a*-N label N of the speech unit, respective corresponding acoustic model (21*a-l* model l . . . 21*a-k* model k . . . 21*a*-N model N) can be found on the model (such as HMM model with decision tree) trained in step S120. In an embodiment of the invention, the following process of estimating training data will be described taking the HMM acoustic model. However, it should be understood that the invention isn't limited thereto.

For given speech unit, its speech parameter vector sequence is expressed as follows:

$$O=[o_1^T, o_2^T, \ldots o_T^T]^T \tag{2}$$

Posterior probability of the speech parameter vector sequence of the speech unit in HMMλ is expressed as:

$$P(O \mid \lambda) = \sum_{Q} P(O, Q \mid \lambda) \tag{3}$$

Wherein, Q is HMM state sequence {q1, q2, . . . , qT}.

Each frame of the speech unit is aligned with a model state, and a state index is obtained. Then, the following probability will be computed:

$$P(o_t, q_i \mid \lambda) = \sum_{j=1}^{N} b_j(o_t) \tag{4}$$

Wherein, $b_j(o_t)$ is an output probability of observer $o_t$ at t time in j-th state of the current model, and its Gaussian distribution probability and it depend upon HMM model, such as, continuous mixture density HMM.

$$b_j(o_t) = P(o_t \mid i, j) = \sum_{m=1}^{M} \omega_{ijm} b_{ij}(o_t) = \frac{1}{(2\pi)^{p/2}|\Sigma_{ij}|^{1/2}} e^{\{-\frac{1}{2}(o_t-\mu_{ij})\Sigma_{ij}^{-1}(o_t-\mu_{ij})^T\}} \tag{5}$$

Wherein, $\omega_{ijm}$ is weight of i-th mixture component of j-th state. $\mu_{ij}$ and $\Sigma_{ij}$ are mean and covariance.

Figure 4:
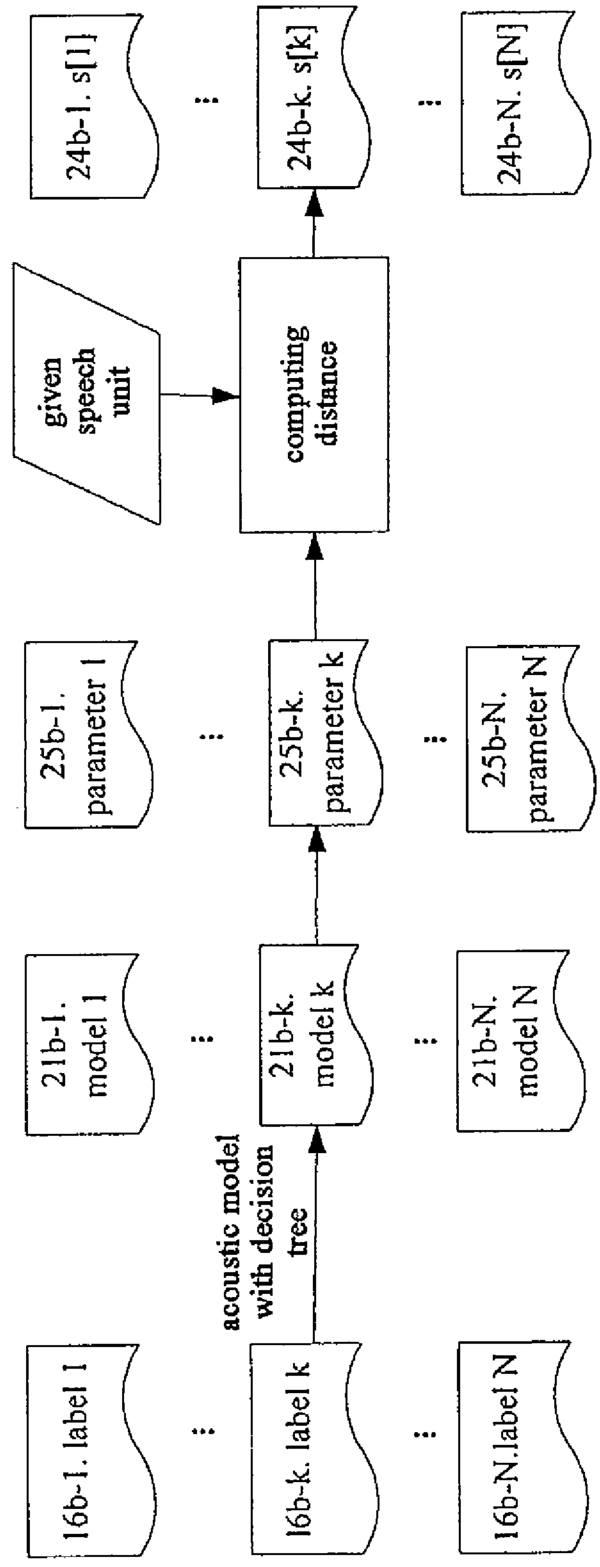
FIG. 4 illustrates a method for estimating training data by a distance between a model generation parameter and a real parameter according to an embodiment of the invention.

Alternatively, in an embodiment of the invention, the train data may also be estimated by distance between model generation parameter and real parameter. FIG. 4 illustrates a method for estimating the train data by a distance between a model generation parameter and a real parameter according to the invention. As show in FIG. 4, a certain speech unit is still taken as an example, which is similar with the above embodiment and it still has all possible context feature labels 16*b-l* label l . . . 16*b-k* label k . . . 16*b*-N label N, and respective corresponding acoustic model 21*a-l* model l . . . 21*a-k* model k . . . 21*a*-N model N are determined. Meanwhile, speech parameters 25*b-l* parameter l . . . 25*b-k* parameter k . . . 25*b*-N parameter N (testing parameters) are recovered according to respective model parameter. Scores of these possible context feature labels are estimated by computing distance between speech parameter (reference parameter) and the recovered parameter of this unit.

As described, for given speech unit, its speech parameter vector sequence O is expressed as $$O=[o_1^T, o_2^T, \ldots o_T^T]^T$$

While the recovered speech parameter may be expressed as $$O'=[o_1^{T'}, o_2^{T'}, \ldots o_T^{T'}]^T \tag{6}$$

There may be difference between real parameter T and the recovered speech parameter T' of given speech unit. Firstly, linear mapping is performed between T and T'. Generally, the recovered speech parameter T' is extended or compressed as T. Then, Euclid distance between them is computed as follows:

$$D(O, O') = \text{sqrt}\left(\sum_{i=1}^{N}\sum_{m=1}^{M}(o_{mi} - o'_{mi})^2\right) \tag{7}$$

In an embodiment of the invention, the fuzzy context label may be generated by a scaled mapping. The fuzzy context label characterizes language and acoustic feature of current speech unit, and performs fuzzy definition in degree for relevant attribute of heteronym to be blurred, and it may be transformed into corresponding context degree (such as high, low and so on) according to score of respective label scaling of speech unit, and performs joint representation to generate fuzzy context label. It is noted that, in the embodiment of the invention, fuzzy context label is generated according to objective computation and may not be limited by linguistics, such as, wei3 or combination of tones 1 and 5 of wei and so on are obtained by computation. Below, the generated fuzzy context label will be illustrated in a process for a certain speech unit with 5 tones.

Figure 5:
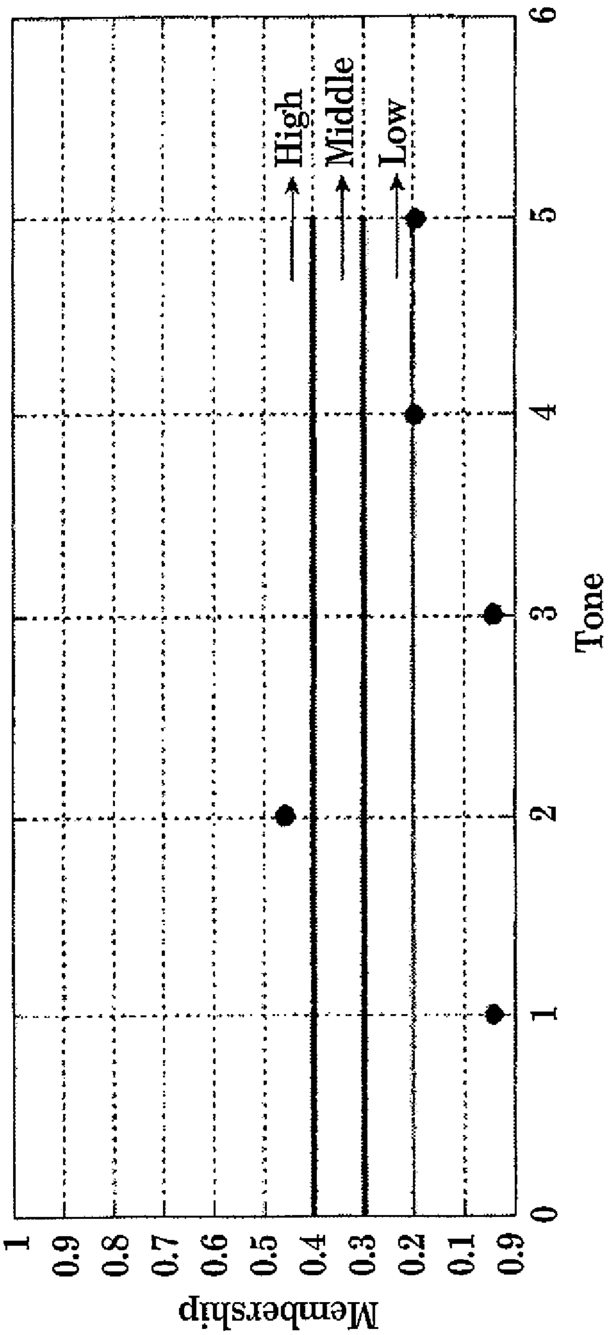
FIG. 5 illustrates a transformation process of normalization mapping for fuzzy data according to an embodiment of the invention.

As shown in FIG. 5, it is assumed that the candidate tone of the unit is tone 2, herein represented as tone=2, the value of degree to which it falls into the category is computed according to respective possible context feature labels (for tone=(1, 2, 3, 4, 5)) of the above membership function (membership). Then, the respective membership function value is normalized, and scales as a value between 0-1, such as (0.05, 0.45, 0.1, 0.2, 0.2). Its context degree is determined, such as, high, middle or low. The context feature label is jointly represented as the fuzzy context feature label.

In an embodiment of the invention, the threshold may be set such as threshold=0.2, only if the speech candidate that satisfies the baseline is taken into account when the fuzzy context feature label is generated, such as, 2, 4 and 5. The fuzzy context feature label will be generated according to a distribution degree corresponding to the above tone, such as, tone=High2_Low4_Low5.

In an embodiment of the invention, the generation of the fuzzy context feature label may have various ways, for example, the scaled fuzzy context may be obtained according to a statistic of score distribution of the same type of the segment in the whole training database and then according to a histogram of distribution ratio. It should be noted that this embodiment of the invention is only for illustration, the approach of generating fuzzy context feature label isn't intended to be limited thereto.

In an embodiment of the invention, various features after blurring may be obtained by generating the fuzzy context feature label, so as to avoid crisp classification in an uncertain attribute class due to the undesirable data.

In an embodiment of the invention, after the fuzzy context feature label is generated for the fuzzy data, the fuzzy decision tree train may be performed, the model parameter of the acoustic model is updated at the same time of the decision tree training. Herein, the determination of the tone is still taken as an example, however, those skilled in the art may understand that, this method is applicable to determine candidate pronunciation for polyphones with different pronunciations. The description is still based on the above example. As shown in Table 2, the corresponding fuzzy question set may be set as:

TABLE 2

Question and Value used in question set
Question illustrated above may contain many cases of classification in combination with tone, and it is questioned for each case. Combination of these cases may originate from language knowledge, and also from real combination occurred while training and so on.

| feature | meaning | value |
|---|---|---|
| tone | Tone is Middle2__Low3? | Tone = Middle2__Low3 |
| tone | Tone belongs to High4 category? | Tone = *High4*, * represents that other combination is possible. |

In an embodiment of the invention, various clustering ways may be used, such as, re-clustering for the whole training database, or clustering only for secondary training database composed of the fuzzy data and so on. While the whole training database is re-clustered, if training data in the training database is the fuzzy data, its label is changed as the fuzzy context feature label generated as above, and similar fuzzy question set is added in question set.

In an embodiment of the invention, while the secondary training database is clustered, training is performed only by using the fuzzy context label and the fuzzy question set based on the trained acoustic model and the decision tree.

By the above clustering, the acoustic model with the fuzzy decision tree is obtained.

In an embodiment of the invention, the acoustic model with the fuzzy decision tree is obtained from the real speech by training to improve the quality of speech synthesis, so as to enable the blurring process to be more reasonable, flexible, and intelligent and enable normal speech to be trained more precisely.

Figure 6:
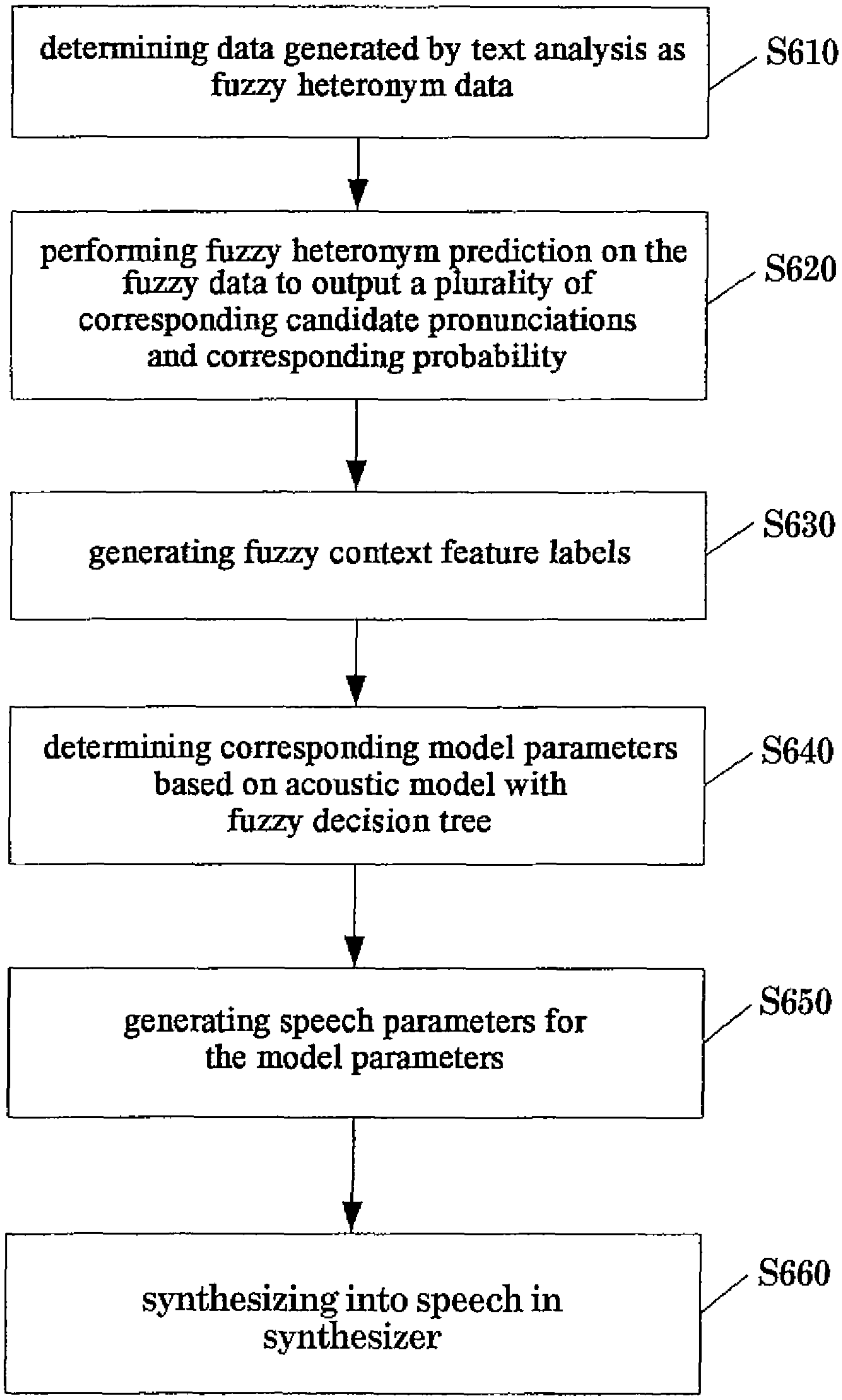
FIG. 6 illustrates a method of synthesizing speech according to an embodiment of the invention.

FIG. 6 illustrates a method of synthesizing speech according to an embodiment of the invention. The method for speech synthesis may comprise: determining data generated by text analysis as fuzzy heteronym data; performing fuzzy heteronym prediction on the fuzzy heteronym data to output a plurality of candidate pronunciations of the fuzzy heteronym data and probabilities thereof; generating fuzzy context feature labels based on the plurality of candidate pronunciations and probabilities thereof; determining model parameters for the fuzzy context feature labels based on acoustic model that has been determined with fuzzy decision tree; generating speech parameters for the model parameters; and synthesizing the speech parameters as speech.

As shown in FIG. 6, in step S610, data generated by the text analysis is determined as the fuzzy heteronym data. In an embodiment of the invention, it is divided into word with attribute label and its pronunciation, and then determines linguistic and rhythm attribute of object speech such as sentence structure and tone as well as pause word distance and so on for each word, each syllable according to semantic rule and phonetic rule. Multi-character word and single-character word are obtained from the result of word segmentation, and generally the pronunciation of the multi-character word can be determined based on the dictionary, which may include some heteronyms, and such heteronyms can not be considered as the fuzzy heteronym data in invention. The heteronym referred to in the embodiment of the invention, means the single-character word which has multiple candidate pronunciations after word segmentation. Then the predicting result of the respective candidate pronunciation is generated during a speech prediction is performed on the heteronym. The predicting result describes the corresponding probability the candidate pronunciation has in the case of specific words. There are many approaches to determine fuzzy heteronym data, for example, a threshold is set and words satisfy the threshold is fuzzy heteronym data. For example, there are none candidate which has a probability above 70% among the candidate pronunciations of heteronym, and the heteronym will be considered as fuzzy heteronym data. The principle for determining the fuzzy heteronym data is similar with that of determining the fuzzy data in training stage, and will be omitted for brevity.

Thereafter, in step S620, fuzzy heteronym prediction is performed on the fuzzy heteronym data to output a plurality of corresponding candidate pronunciations and probabilities thereof of the fuzzy heteronym data. In some embodiments of the invention, for non-fuzzy heteronym data, its pronunciation may be determined in a high reliability, and thus it doesn't need to blur, but heteronym prediction is performed on it to output the determined candidate pronunciation. If the heteronym is fuzzy heteronym data, the blurring process is performed to output a plurality of candidate pronunciations and corresponding probabilities.

Next, in step S630, the fuzzy context feature label is generated and is based on the plurality of candidate pronunciations and probabilities thereof. In some embodiments of the invention, the execution of this step is similar to step S160 for generating the fuzzy context feature label, and both of them can be transformed by scaled mapping or achieved in other ways, and will be omitted for brevity.

In step S640, corresponding model parameters are determined for the fuzzy context feature label based on acoustic model with fuzzy decision tree. In some embodiments of the invention, for the HMM acoustic model, the corresponding model parameter is distributed for the respective component in states.

In step S650, speech parameters are generated for the model parameters. Common parameter generating algorithms known in the art may be used, such as, parameter generating algorithm according to maximum likelihood probability condition, and will be omitted for brevity.

Finally, in step S660, the speech parameters are synthesized into speech.

In one embodiment of the invention, speech is synthesized by a blurring process for pronunciation of fuzzy heteronym data, such that the pronunciation may have various changes in different context environments, thereby improving the quality of speech synthesis.

Figure 7:
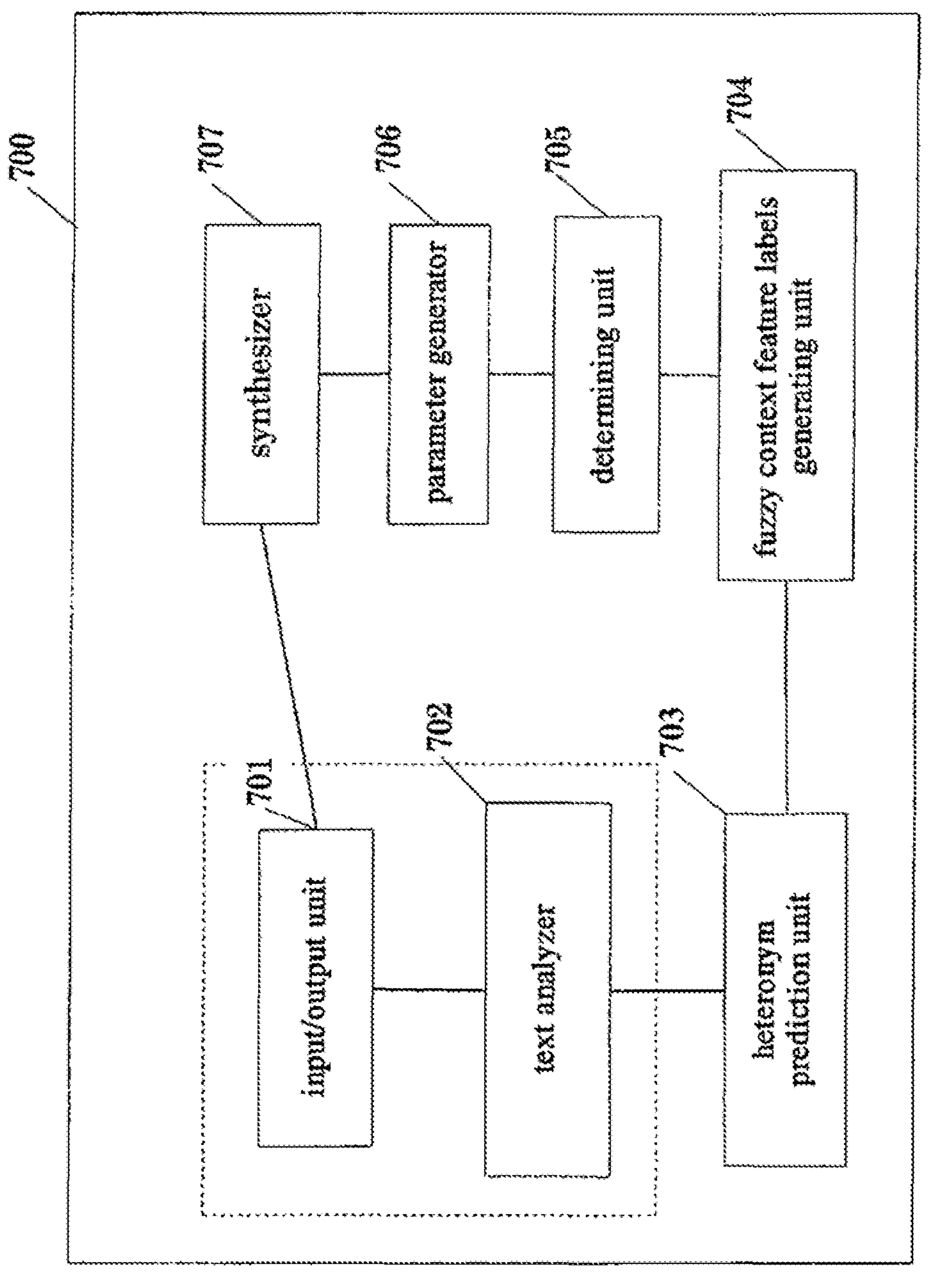
FIG. 7 is block diagram of an apparatus for synthesizing speech according to an embodiment of the invention.

In the same inventive concept, FIG. 7 is block diagram of an apparatus for synthesizing speech according to the invention. Then, this embodiment will be described with reference to this drawing. For those parts similar with the above embodiments, their description will be omitted.

The apparatus 700 for synthesizing speech may comprise: heteronym prediction unit 703 for predicting pronunciation of fuzzy heteronym data to output a plurality of candidate pronunciations of the fuzzy heteronym data and predicting probabilities; fuzzy context feature labels generating unit 704 for generating fuzzy context feature labels based on the plurality of candidate pronunciations and probabilities thereof; determining unit 705 for determining model parameters for the fuzzy context feature labels based on acoustic model with fuzzy decision tree; parameter generator 706 for generating speech parameters for the model parameters; and synthesizer 707 for synthesizing the speech parameters as speech.

The apparatus 700 for synthesizing speech may achieve the method for synthesizing speech, the detailed operation of which is with reference to the above content and will be omitted for brevity.

In another embodiment of the invention, the apparatus 700 may also include: text analyzer 702 for dividing text to be synthesized into the word with attribute label and its pronunciation. Alternatively, the apparatus 700 may also include: input/output unit 701 for inputting text to be synthesized and outputting the synthesized speech. Alternatively, the character string after text analysis may be input from outside. Thus, as shown in FIG. 7, text analyzer 702 and/or input/output unit 701 is shown by dashed line.

In one embodiment of the invention, the apparatus 700 and its various constituent parts for synthesizing speech may be implemented by computer (processor) executing corresponding program.

Those skilled in the art can appreciate that, the above methods and apparatuses may be implemented by using computer executable instructions and/or being included into processor control codes, which is provided on carrier media such as a disk, a CD, or a DVD-ROM, a programmable memory such as read only memory (firmware) or data carrier such optical or electronic signal carriers. The method and apparatus may also be implemented by a semiconductor such as a super large integrated circuit or gate array, such as a logic chip, a transistor, or a hardware circuit of programmable hardware device such as a field programmable gate array, a programmable logic device and so on, and may also be implemented by a combination of the above hardware circuit and software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for speech synthesis, comprising:

determining data generated by text analysis as fuzzy heteronym data;

performing a fuzzy heteronym prediction on the fuzzy heteronym data to output a plurality of candidate pronunciations of the fuzzy heteronym data and probabilities thereof;

generating fuzzy context feature labels based on the plurality of candidate pronunciations of the fuzzy heteronym data and the probabilities thereof;

determining model parameters for the fuzzy context feature labels based on an acoustic model with a fuzzy decision tree;

generating speech parameters for the model parameters, using a device selected from the group consisting of a computer and a logic circuit; and synthesizing the speech parameters as speech.

2. The method according to claim 1, wherein the step of generating fuzzy context feature labels further comprises:

determining a degree to which context labels of candidate pronunciations of the fuzzy heteronym data fall into category based on the probabilities; and transforming the degree by scaling to generate the fuzzy context feature labels, wherein the fuzzy context feature labels are joint representation of context labels of the candidate pronunciations.

3. An apparatus for synthesizing speech, comprising:

a heteronym prediction unit, implemented in a logic circuit, for predicting pronunciation of fuzzy heteronym data to output a plurality of candidate pronunciations of the fuzzy heteronym data and predicting probabilities;

a fuzzy context feature labels generating unit, implemented in a logic circuit, for generating fuzzy context feature labels based on the plurality of candidate pronunciations of the fuzzy heteronym data and the probabilities thereof;

a determining unit, implemented in a logic circuit, for determining model parameters for the fuzzy context feature labels based on an acoustic model with a fuzzy decision tree;

a parameter generator, implemented in a logic circuit, for generating speech parameters for the model parameters; and a synthesizer, implemented in a logic circuit, for synthesizing the speech parameters as speech.

4. The apparatus according to claim 3, wherein the fuzzy context feature labels generating unit is further configured to:

determine a degree to which context labels of candidate pronunciations of the fuzzy heteronym data fall into category based on the probabilities; and transform the degree by scaling to generate the fuzzy context feature labels, wherein the fuzzy context feature labels are joint representation of context labels of the candidate pronunciations.

5. A system for synthesizing speech, comprising:

a logic circuit for determining data generated by text analysis as fuzzy heteronym data;

a logic circuit for performing fuzzy heteronym prediction on the fuzzy heteronym data to output a plurality of candidate pronunciations of the fuzzy heteronym data and probabilities thereof;

a logic circuit for generating fuzzy context feature labels based on the plurality of candidate pronunciations of the fuzzy heteronym data and the probabilities thereof;

a logic circuit for determining model parameters for the fuzzy context feature labels based on an acoustic model with a fuzzy decision tree;

a logic circuit for generating speech parameters for the model parameters; and a logic circuit for synthesizing the speech parameters as speech.

6. A method for training acoustic model, comprising:

a training respective speech unit in a speech database to generate an acoustic model, the speech unit includes acoustic parameters and context labels;

for context combination, performing a decision tree clustering process to generate the acoustic model with a decision tree;

determining fuzzy data in the speech database based on the acoustic model with the decision tree;

generating the fuzzy context feature labels for the fuzzy data; and cluster training the speech database based on the fuzzy context feature labels to generate the acoustic model with the fuzzy decision tree, using a device selected from the group consisting of a computer and a logic circuit.

7. The method according to claim 6, wherein the step of determining the fuzzy data further comprises:

estimating the speech unit;

determining a degree to which candidate context labels of the speech unit fall into a category; and determining the speech unit as the fuzzy data if the degree satisfies a predetermined threshold.

8. The method according to claim 7, wherein the step of estimating the speech unit further comprises:

estimating scores of the context feature labels of candidate pronunciations of the speech unit by model posterior probability or distance between model generating parameters and speech unit parameters.

9. The method according to claim 6, wherein the step of generating the fuzzy context feature labels further comprises:

determining scores of the context feature labels of candidate pronunciations of the speech unit by estimating the speech unit;

determining a degree to which the candidate context labels of the speech unit fall into the category; and transforming the degree by scaling to generate the fuzzy context feature labels, wherein the fuzzy context feature labels are joint representation of context labels of the candidate pronunciations.

10. The method according to claim 6, wherein the step of cluster training based on the fuzzy context feature labels further comprises one of:

training a training set including the fuzzy data based on the fuzzy context feature labels and a predefined fuzzy question set to generate the acoustic model with the fuzzy decision tree; and re-training the respective speech unit in the speech database based on a question set and context feature labels, wherein the question set further includes a predefined fuzzy question set, and the context feature labels of the fuzzy data in the speech database are the fuzzy context feature labels.

* * * * *